United States Patent [19]
Ueda et al.

[11] Patent Number: 5,201,591
[45] Date of Patent: Apr. 13, 1993

[54] CHARACTER PRINTING DEVICE WITH PRESSURE IMPACT CONTROL

[75] Inventors: Hiroyuki Ueda; naoki Shimada, both of Irvine, Calif.

[73] Assignee: Canon Business Machines, Inc., Costa Mesa, Calif.

[21] Appl. No.: 873,988

[22] Filed: Apr. 27, 1992

Related U.S. Application Data

[63] Continuation of Ser. No. 638,546, Jan. 8, 1991, abandoned.

[51] Int. Cl.$^5$ .............................................. B41J 1/34
[52] U.S. Cl. .................................. 400/166; 400/497; 400/697
[58] Field of Search .................. 400/157.3, 166, 697, 400/697.1, 698, 695, 696, 497, 139, 187, 163.1, 163.2, 163.3, 163.4; 101/93.03

[56] References Cited

U.S. PATENT DOCUMENTS

| | | | |
|---|---|---|---|
| 4,037,208 | 7/1977 | Osterlund et al. | 400/157.3 |
| 4,353,526 | 10/1982 | Sohl et al. | 400/166 |
| 4,493,253 | 1/1985 | Vyas | 101/93.03 |
| 4,558,965 | 12/1985 | Ueda et al. | 400/166 |
| 4,683,817 | 8/1987 | Del Signore, II | 400/166 |
| 4,690,575 | 9/1987 | Ueda et al. | 400/166 |
| 4,692,045 | 9/1987 | Makita et al. | 400/697 |
| 4,728,209 | 3/1988 | Kumamoto et al. | 400/697.1 |
| 4,749,289 | 6/1988 | Sugiura et al. | 400/696 |
| 4,797,017 | 1/1989 | Okouchi | 400/166 |
| 4,806,031 | 2/1989 | Amdahl et al. | 400/157.3 |
| 4,856,921 | 8/1989 | Hatakeyama | 400/697 |
| 4,881,835 | 11/1989 | Niikama | 400/157.3 |
| 5,028,157 | 7/1991 | Kikugawa | 400/696 |
| 5,037,217 | 8/1991 | Suzuki et al. | 400/157.3 |
| 5,044,802 | 9/1991 | Sugiyama | 400/697 |

FOREIGN PATENT DOCUMENTS

| | | | |
|---|---|---|---|
| 2511527 | 3/1975 | Fed. Rep. of Germany | 400/697 |
| 3305320 | 8/1983 | Fed. Rep. of Germany | 400/697.1 |
| 3328466 | 2/1985 | Fed. Rep. of Germany | 400/166 |
| 0021124 | 2/1979 | Japan | 400/166 |
| 56-20587 | 5/1981 | Japan . | |
| 58-15820 | 3/1983 | Japan . | |
| 0128882 | 8/1983 | Japan | 400/166 |
| 0036182 | 2/1985 | Japan | 400/697.1 |
| 0087366 | 4/1987 | Japan | 400/695 |
| 0005872 | 6/1987 | Japan | 400/695 |
| 2110853 | 6/1983 | United Kingdom | 400/166 |

OTHER PUBLICATIONS

"Typewriter Print Impression Control" IBM Technical Disclosure Bulletin, vol. 24, No. 8, Jan. 1982, pp. 4316–4317.

"Printer Impact Control" IBM Technical Disclosure Bulletin, vol. 18, No. 11, Apr. 1976, pp. 3533–3534.

"Electronic Control of Print Impact in Single-Element Typewriters" IBM Tech. Discl. Bulletin vol. 21, No. 10, Mar. 1979, pp. 4110–4112.

*Primary Examiner*—Eugene H. Eickholt
*Attorney, Agent, or Firm*—Fitzpatrick, Cella, Harper & Scinto

[57] ABSTRACT

An impact-type printing device includes a printer for printing characters with a plurality of impression pressures including a high impression pressure sufficient for printing on all of the sheets of a set of copy sheets. The device also include a keyboard having a key for selecting one of the plurality of impression pressures when the device operates in a normal operation mode. The device further includes a switch for switching the device between the normal operation mode and a copy mode of operation. In the normal mode the printer is capable of printing in any of the plurality of impression pressures selected by the operator at the keyboard. In the copy mode the printer prints only with a high pressure, sufficient for printing on all of the sheets of the set of copy sheets. The device also erases a previously printed character when in the normal mode and overstrikes the previously printed character in the copy mode.

27 Claims, 17 Drawing Sheets

PURCHASING ORDER

| NO. | DESCRIPTION | PART NO. | QTY. | AMT. |
|---|---|---|---|---|
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |

Il me fallet lonh
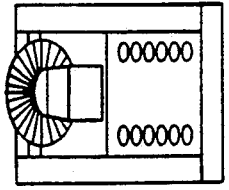
FIG. 9(a)(1)
49 6C 20 6D 65 20 66 41 6C
6C 65 74 20 6C 6F 6E 68
FIG. 9(a)(2)
Il me fallet lon
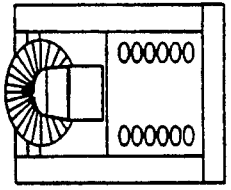
FIG. 9(b)(1)
49 6C 20 6D 65 20 66 41 6C
6C 65 74 20 6C 6F 6E
FIG. 9(b)(2)
Il me fallet long
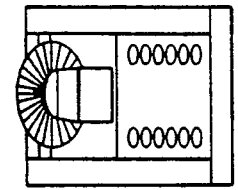
FIG. 9(c)(1)
49 6C 20 6D 65 20 66 41 6C
6C 65 74 20 6C 6F 6E 67
FIG. 9(c)(2)

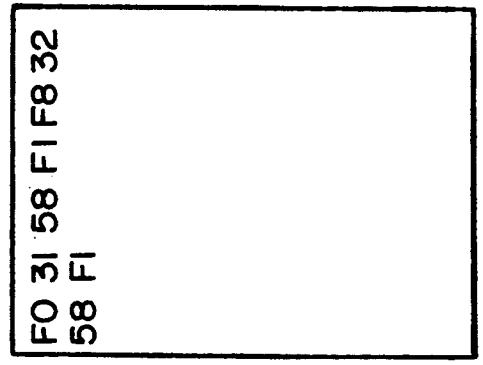
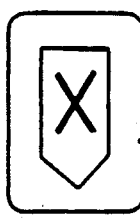
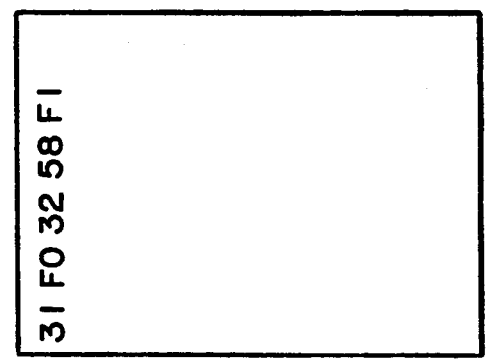
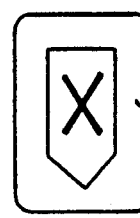
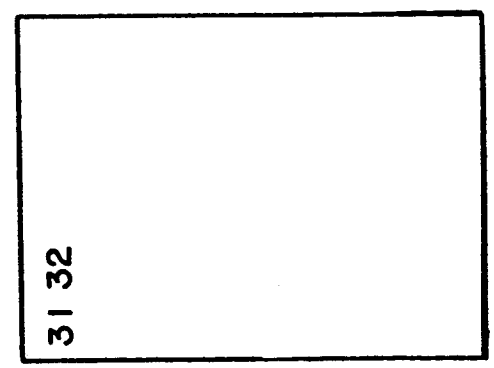
FIG. 10(a) SURFACE SHEET
FIG. 10(b) SECOND OR LATER SHEET

| SELECTED LETTER | RESULT OF DELETION |
|---|---|
| X | $777.77 ↓ XXXXXX |
| = | $777.77 ↓ ~~$777.77~~ |

FIG. 11

CHARACTER PRINTING DEVICE WITH PRESSURE IMPACT CONTROL

This application is a continuation of application Ser. No. 07/638,546 filed Jan. 8, 1991, now abandoned.

BACKGROUND OF THE INVENTION

1. Field of the Invention

The invention relates to a character printing device and more particularly, to an impact printer for printing with a plurality of impression pressures and for erasing or overstriking misprinted characters.

2. Description of Pertinent Information

Impact-type typing devices such as electronic typewriters can be used to type characters on a set of carbon copy forms 10, as shown in FIG. 1(b). The set is composed of a top form 2, shown in FIG. 1(a), and two sheets of carbon paper 4, 4, positioned between the top form and a middle form 6, and between the middle form and a bottom form 8. The middle and bottom forms 6 and 8 are identical to the top form 2.

Unlike typing on a single form, care must be taken by the operator when performing printing or correcting on a set of carbon copy forms. Otherwise, the carbon copies will not be legible, or the correction will not be completely made. This is due to several reasons.

First, the force with which the typing elements must be impressed on a set of carbon forms is greater than the force with which the typing element must be impressed on a single sheet of paper. Therefore, if the operator forgets to check or change the impression force when typing on a set of carbon copy forms, a clear overstrike may not be made on the bottom-most sheet of the set. This situation is shown in FIG. 2(a). Thus, the operator must make sure that the impression force is increased when typing on a carbon copy form in order to leave a clear overstrike on all of the sheets of the set, as shown in FIG. 2(b).

Second, performing the correction operation is complicated. Correcting an incorrectly typed character is typically performed by striking over the incorrectly typed characters with another character, as shown in FIG. 3(a). In this example, numbers "1,2,3,4,5, and 6" are struck over with an "X". However, before this can be done, the typing portion of the typewriter must be backed up to the position of the incorrectly printed characters. In addition, a typing element must strike over the exact number of characters that are incorrectly printed. Any character may be used for such an overstriking operation, as shown in FIG. 3(b), which shows overstriking of an "X", an equal sign, and a Roman Numeral. However, the operator must usually use the same character for the overstrike operation as the printed character to be erased in order to ensure complete erasure.

Consequently, performing printing and correcting operations on sets of carbon copy forms is complicated for the operator and requires a complex typewriter.

SUMMARY OF THE INVENTION

It is an object of the present invention to overcome the problems of the prior art.

It is still another object of the present invention to perform printing and correcting on a set of carbon copy forms in a manner that is convenient for the operator.

It is still another object of the present invention to expand the capabilities of character printing devices.

It is another object of the present invention to provide a character printing device which can operate in a mode exclusively for paper having characteristics different from normal paper, such as sets of carbon copy forms, as shown in FIG. 1(b).

It is still another object of the present invention to provide a character printing device which can enable and disable a mode of operation of the device used exclusively for typing on special paper, such as the set of carbon copy forms shown in FIG. 1(b).

It is another object of the present invention to provide a printer which, when it operates in an exclusive mode for printing on a set of carbon copy forms, the impression pressure is automatically set to a high level.

It is a further object of the present invention to provide a printer which, by manually operating a delete key on a keyboard, the printer will type over or overstrike desired characters.

It is another object of the present invention to provide a device which can enable the overstrike of characters when a typing error is corrected.

It is still another object of the present invention to provide a printing device which, when an exclusive mode is disabled, the impression pressure previously set before the device operated in the exclusive mode is now set again and manual operation of a key returns the apparatus to a mode in which a normal erasing operation can occur.

It is also an object of the present invention to provide means for permitting a printer to operate in an overstrike mode in response to manual operation of the delete key, irrespective of whether the device operates in the exclusive mode for printing with a high impression pressure on a set of carbon copy forms.

According to a first aspect, the invention which achieves these objectives relates to an impact-type printing device comprising means for printing a character with a plurality of impression pressures including a high impression pressure sufficient for printing on all the sheets of a set of copy sheets, means for selecting one of the plurality of impression pressures when the device operates in a normal operation mode, and means for switching the device between the normal operation mode and a copy mode of operation. In the normal mode the printing means is capable of printing in any of the plurality of impression pressures selected by the selecting means. In the copy mode the printing means prints only with the high impression pressure sufficient for printing on all of the sheets of the set of copy sheets. The selecting means can select a first impression pressure in the normal operation mode. When the switching means switches the device from the copy mode to the normal mode, the printing means prints with the first impression pressure previously set by the selecting means. The device further comprises means for performing an overstrike operation on a previously printed character printed by the printing means when the device operates in the copy mode. In addition, the device comprises manual actuating means for manually actuating the printing means to perform an overstrike operation. The printing means performs an overstrike operation on the printed character in response to the operation of the manual actuation means and when the device operates in the copy mode. The device also comprises means for performing an erasing operation for erasing the printed character. The erasing means performs an erasing operation in response to the operation of the manual actuation means and when the device operates in the normal mode. The device further comprises a ribbon having an inked portion and an adhesive portion. The printing means operates on the inked portion of the ribbon and the erasing means operates on the adhesive portion of the ribbon.

According to another aspect, the device relates to an impact-type printing device comprising a keyboard comprising a plurality of keys including an impression pressure key and at least one mode selection key, a carrier unit, and a processor electrically connected to the carrier unit and the keyboard. The processor switches the device between a normal operation mode and a copy mode of operation in response to the depression of the at least one mode selection key. In the normal mode the device is capable of printing with a plurality of impression pressures selected by the impression pressure key. In the copy mode the device prints only with a high impression pressure sufficient for printing on all the sheets of a set of copy sheets. The carrier unit comprises a hammer, a hammer control circuit connected to the processor and the hammer, a ribbon, and a daisy wheel comprising a letter plate adapted to be positioned between the hammer and the ribbon. The hammer is displaceable to strike the letter plate. The letter plate is displaceable to press the ribbon against a recording medium with a plurality of impression pressures including a high impression pressure sufficient for printing on all the sheets of a set of copy sheets in response to being struck by the hammer. The processor selects one of the plurality of impression pressures in response to the depression of the depression of the impression pressure key and in response to the at least one mode selection key inputting a signal to the processor indicating the selection of the normal mode. The processor selects the high impression pressure in response to the at least one mode selection key inputting a signal indicating the selection of the copy mode. The hammer strikes the letter plate with the high impression pressure in response to receiving a signal from the hammer control circuit generated in response to a signal from the processor when in the copy mode. The hammer strikes the letter plate with an impression pressure selected in response to depression of the impression pressure key when the device operates in the normal mode.

After the processor switches the device from the normal mode in which a first impression pressure was selected to the copy mode and then back to the normal mode in response to signals from the at least one mode selection key, the processor instructs the hammer control circuit to control the hammer to strike the letter plate with the previously selected first impression pressure. The processor instructs the hammer, the letter plate, and the ribbon to perform an overstrike operation on a character previously printed by the device when the processor instructs the device to operate in the copy mode. The keyboard further comprises a correction key for instructing the processor to actuate an overstrike operation. The hammer, the letter plate, and the ribbon perform an overstrike operation on the previously printed character in response to the operation of the correction key and when the processor instructs the device to operate in the copy mode. The ribbon comprises an inked portion and an erasing portion. The device further comprises a carrier unit motor and a daisy wheel motor. The processor controls the carrier unit motor and the daisy wheel motor to align the erasing portion of the ribbon and a character on the letter plate with the previously printed character to permit an erasing operation to be performed. The processor controls the carrier unit motor and the daisy wheel motor to align the inked portion of the ribbon and a character on the letter plate with the previously printed character to permit an overstrike operation to be performed. The carrier unit motor and the daisy wheel motor align the erasing portion and a character on the letter plate with the previously printed character and the processor instructs the hammer control circuit to instruct the hammer to strike the letter plate in response to the operation of the correction key and when the device operates in the normal mode. The carrier unit motor and the daisy wheel motor align the inked portion and a character on the letter plate with the previously printed character and the processor instructs the hammer control circuit to instruct the hammer to strike the letter plate in response to the operation of the correction key and when the device operates in the copy mode.

According to another aspect, the apparatus relates to a method of printing using an impact-type printing device comprising the steps of setting the device to operate in a normal mode, selecting one of a plurality of impression pressures with which printing of a character will occur when the device is set to operate in the normal mode in the setting step, printing with the selected impression pressure in the normal mode, setting the device to operate in a copy mode in which printing of the character can occur only with a high impression pressure sufficient for printing on all of the sheets of a set of copy sheets, and printing with the high pressure in the copy mode. The normal mode setting and printing steps comprise a first pair of steps and the copy setting and printing steps comprise a second pair of steps. The two pairs of setting and printing steps can occur in any order with respect to each other. The normal mode setting step occurs before the copy mode setting step. The selecting step selects a first impression pressure. The method further comprises the step of switching the operating mode of the device back to the normal mode after the copy mode setting step and automatically setting the previously selected first impression pressure after the copy mode setting step. The method additionally comprises the step of performing an overstrike operation on a printed character in response to the copy mode setting step being performed. The method also comprises the step of manually actuating a first key on the printing device. The overstrike operation step is performed in response to the performing of the manual actuation step and the performing of the copy setting step. The method further comprises the step of erasing a printed character in response to the performing of the manual actuation step and the normal mode setting step. Moreover, the method comprises the step of manually actuating a second key on the printing device to switch the device between the normal mode and the copy mode.

According to still another aspect, the invention relates to a printing device comprising means for switching the device between a normal mode in which printing occurs with any one of a plurality of impression pressures and a copy mode in which printing occurs only with a high impression pressure sufficient to print on all of the sheets of a set of copy sheets, and means for correcting a previously printed character by erasing the previously printed character when the device is in the normal mode and by overstriking the previously printed character when the device is in the copy mode. The switching means comprises a keyboard comprising a code key and a z key, and a microprocessor for switching the device between the two modes in response to the simultaneous pressing of the code key and the z key. The device further comprises a memory, and the microprocessor sets a flag in the memory when the device operates in the copy mode. The correcting means overstrikes the previously printed character when the flag is set and erases the previously printed character when the flag is not set.

According to another aspect, the apparatus relates to a printing device comprising a keyboard comprising a plurality of keys including a correction key and a plurality of character keys, means for correcting a previously printed character by overstriking the previously printed character in response to a manual operation of the correction key, means for switching the device into and out of a character overstrike selecting mode for selection a character to overstrike the previously printed character, and a memory for storing the character selected in the character overstrike selecting mode. In the character overstrike selecting mode, when one of the character keys is depressed, the corresponding character is stored in the memory. In response to the manual operation of the correction key, the character stored in the memory overstrikes the previously printed character. The keyboard further comprises a code key and an X key. The switching means comprises a microprocessor connected to the keyboard, the code key, and the X key. The microprocessor switches the device into or out of the character overstrike selecting mode in response to simultaneous pressing of the code key and the X key. The keyboard further comprises a non-character key representing a non-printable character. The non-printable character is not set in the memory when, in the character overstrike selecting mode, the corresponding non-character key is depressed. The device further comprises a hammer, a ribbon, and a letter plate adapted to be positioned between the hammer and the ribbon, the hammer being displaceable to strike the letter plate, and the letter plate being displaceable to press the ribbon against a recording medium in response to being struck by the hammer. The memory comprises a random access memory. The correcting means comprises the hammer, the ribbon, the letter plate, a hammer control unit connected to the hammer, a motor driver, a motor connected to the motor driver and the letter plate, and a microprocessor unit connected to the hammer control circuit and the motor driver.

These and further objects and features of the invention will become apparent from the following detail description of preferred embodiments when taken in conjunction with the accompanying drawings.

BRIEF DESCRIPTION OF THE DRAWINGS

FIG. 1(a) shows an example of a typical form and FIG. 1(b) shows a set of copy forms;

Figures 3A, 3B:
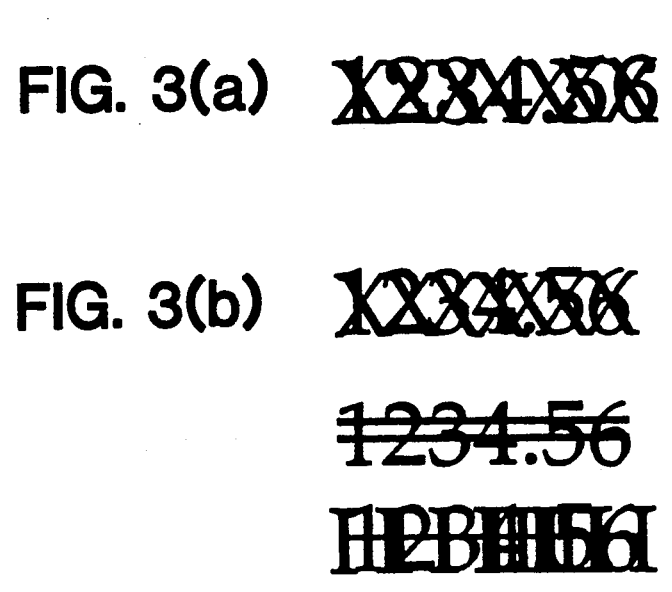

FIG. 3(a) shows an example of correcting via an overstrike using the letter "X" and FIG. 3(b) shows an example of correction via overstriking using a variety of characters;

FIG. 9(a)(1) shows a set of characters printed on a recording medium and the cassette that printed these characters;

FIG. 9(a)(2) shows the contents of the RAM of the present invention corresponding to the characters printed in FIG. 9(a)(1);

FIG. 9(b)(1) shows the characters printed on the sheet in FIG. 9(a)(1), except that the "h" has been erased, and the cassette which has typed and erased these characters;

FIG. 9(b)(2) shows the contents of the RAM of the present invention corresponding to characters shown in FIG. 9(b)(1);

FIG. 9(c)(1) shows the characters illustrated in FIG. 9(b)(1), except that the erased character has been replaced by the correct character, and the cassette which performs this function;

FIG. 9(c)(2) shows the contents of a RAM of the present invention which corresponds to the characters printed in FIG. 9(c)(1);

FIG. 10(a) shows an example of printing on a top and a second or later sheet of a set of carbons, along with an overstrike of the characters printed on these sheets;

FIG. 10(b) shows the contents of the RAM of the present invention which correspond to the characters which are printed and overstriked in FIG. 10(a);

FIG. 11 is a diagram showing a character selected for overstrike in an automatic correction function of the typewriter, and the result of such an overstriking;

DETAILED DESCRIPTION OF PREFERRED EMBODIMENTS

Figure 4:
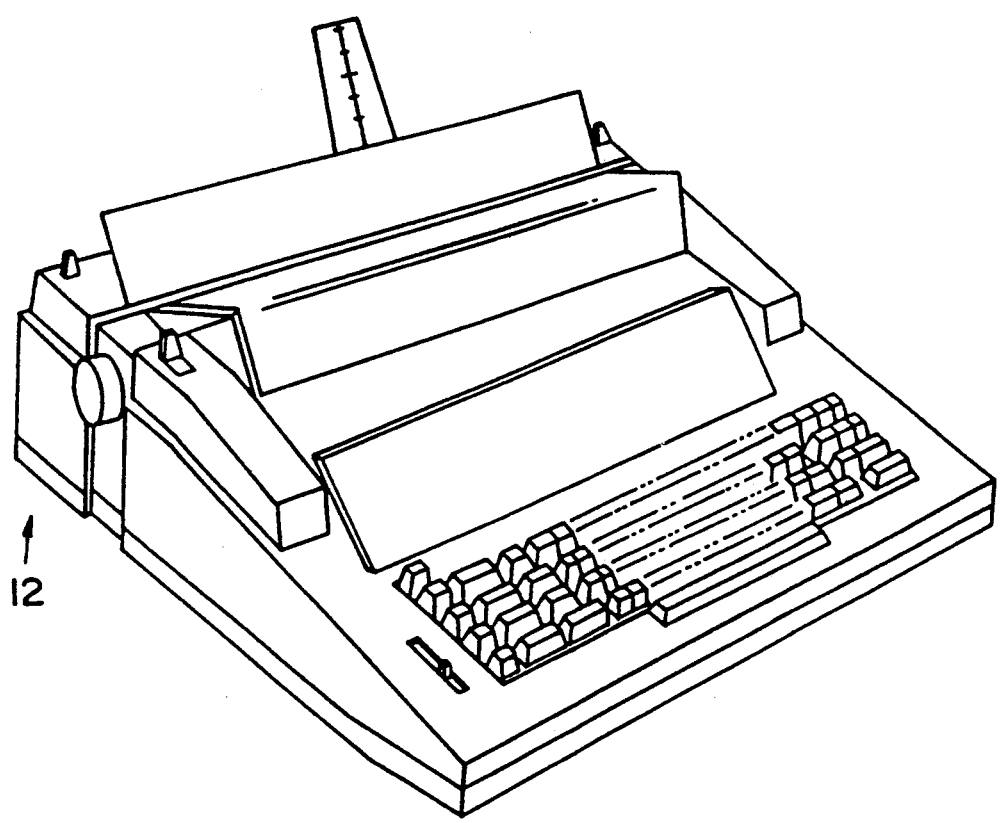
FIG. 4 is a perspective view of a typewriter of the present invention.

FIG. 4 shows the exterior of an electronic typewriter 12 embodying the principles of the present invention.

Figure 5A:
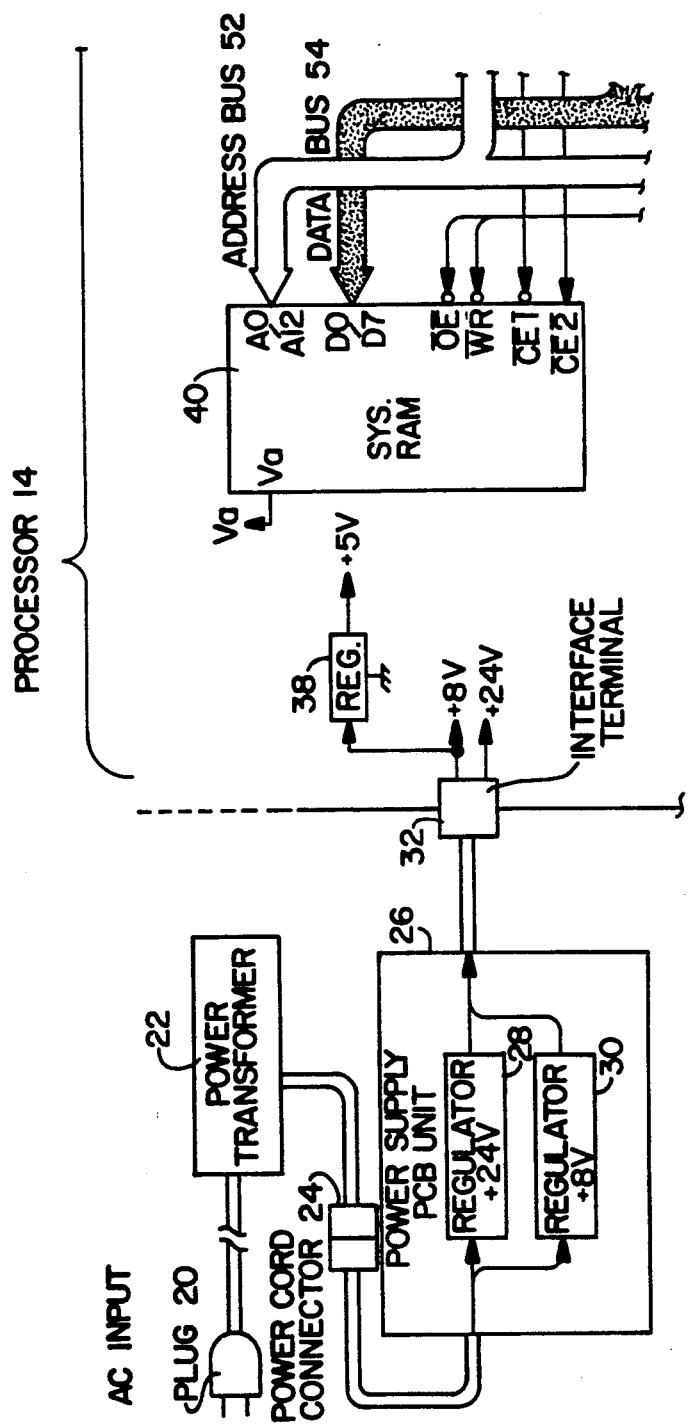
FIGS. 5(a), 5(b) and 5(c) are block diagrams of the electronic typewriter of the present invention.
Figure 5B:
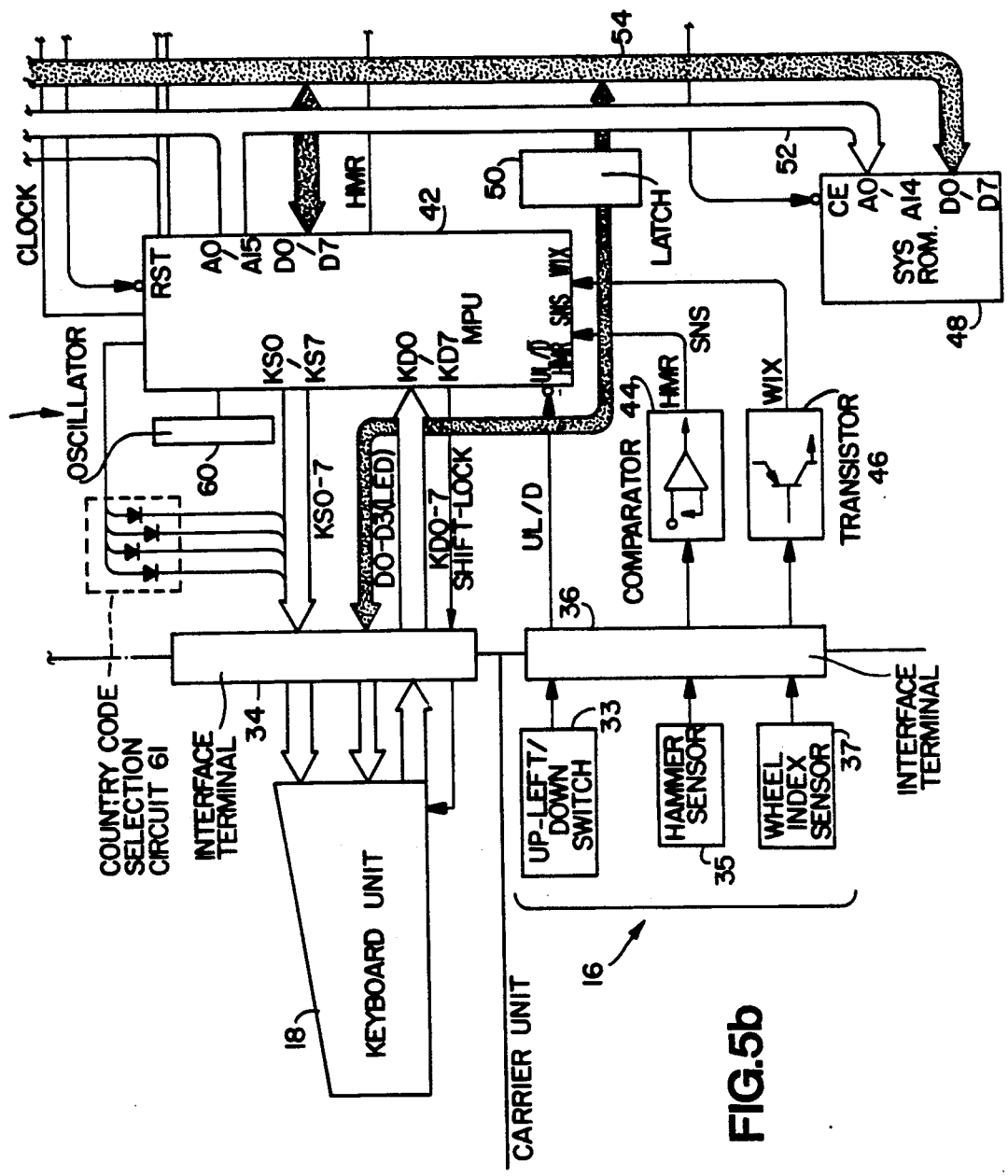
Figure 5C:
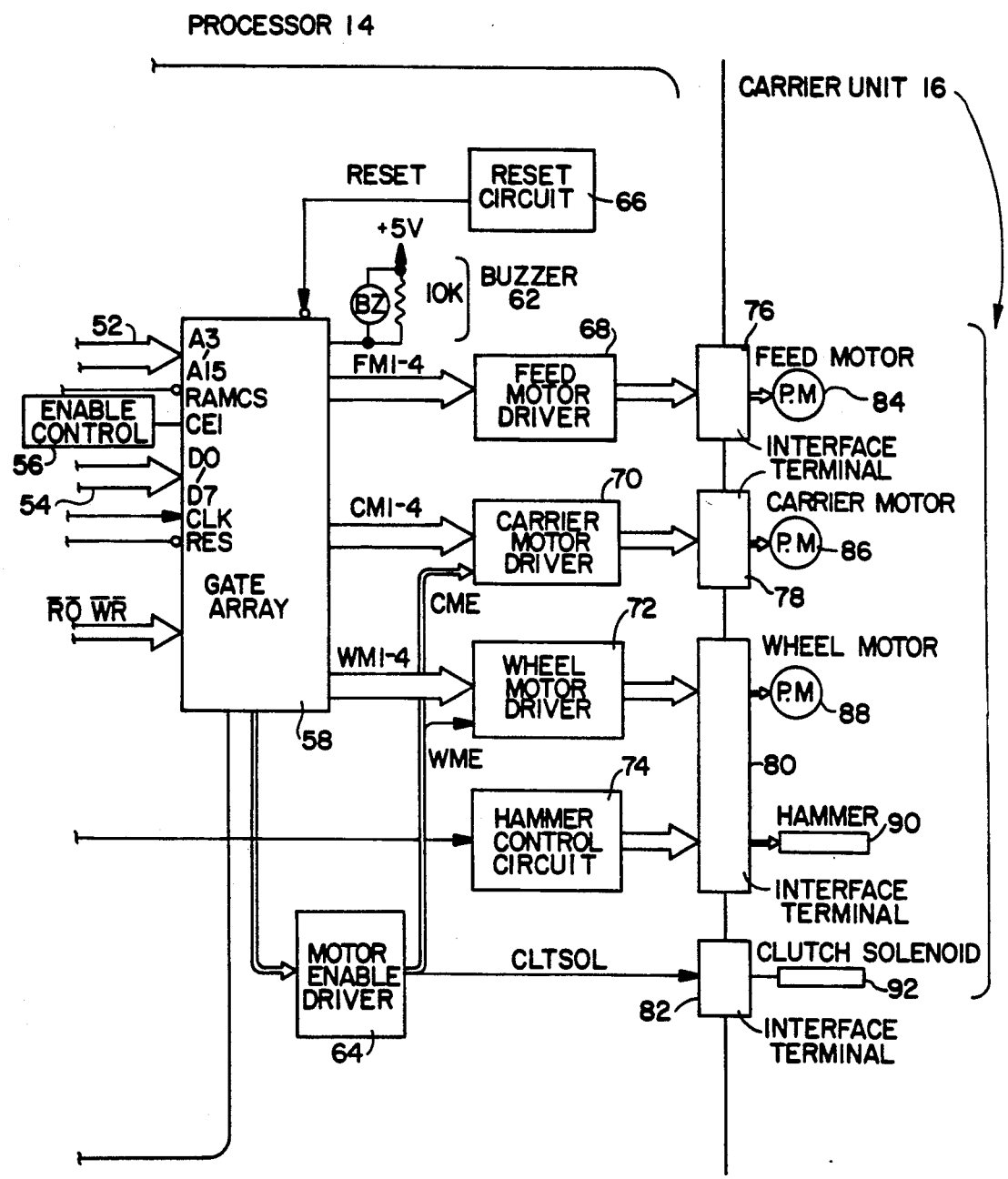

FIGS. 5(a), 5(b), and 5(c) show block diagrams of the details of the typewriter 12. Specifically, typewriter 12 comprises a carrier unit 16 for performing the printing and correcting operations. Carrier 16 is controlled by a processor 14, which receives data input by a keyboard unit 18.

Figure 1A:
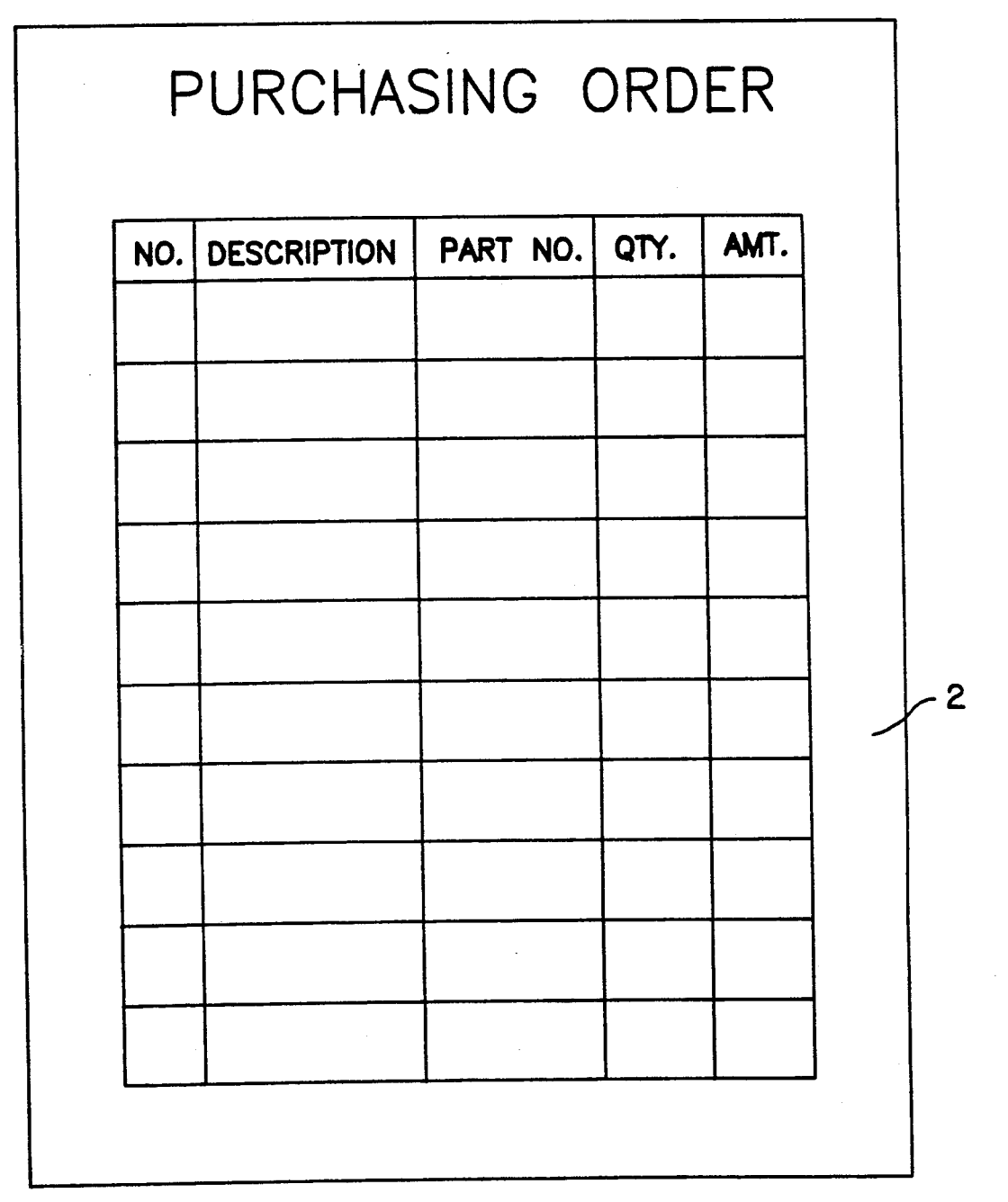
Figure 1B:
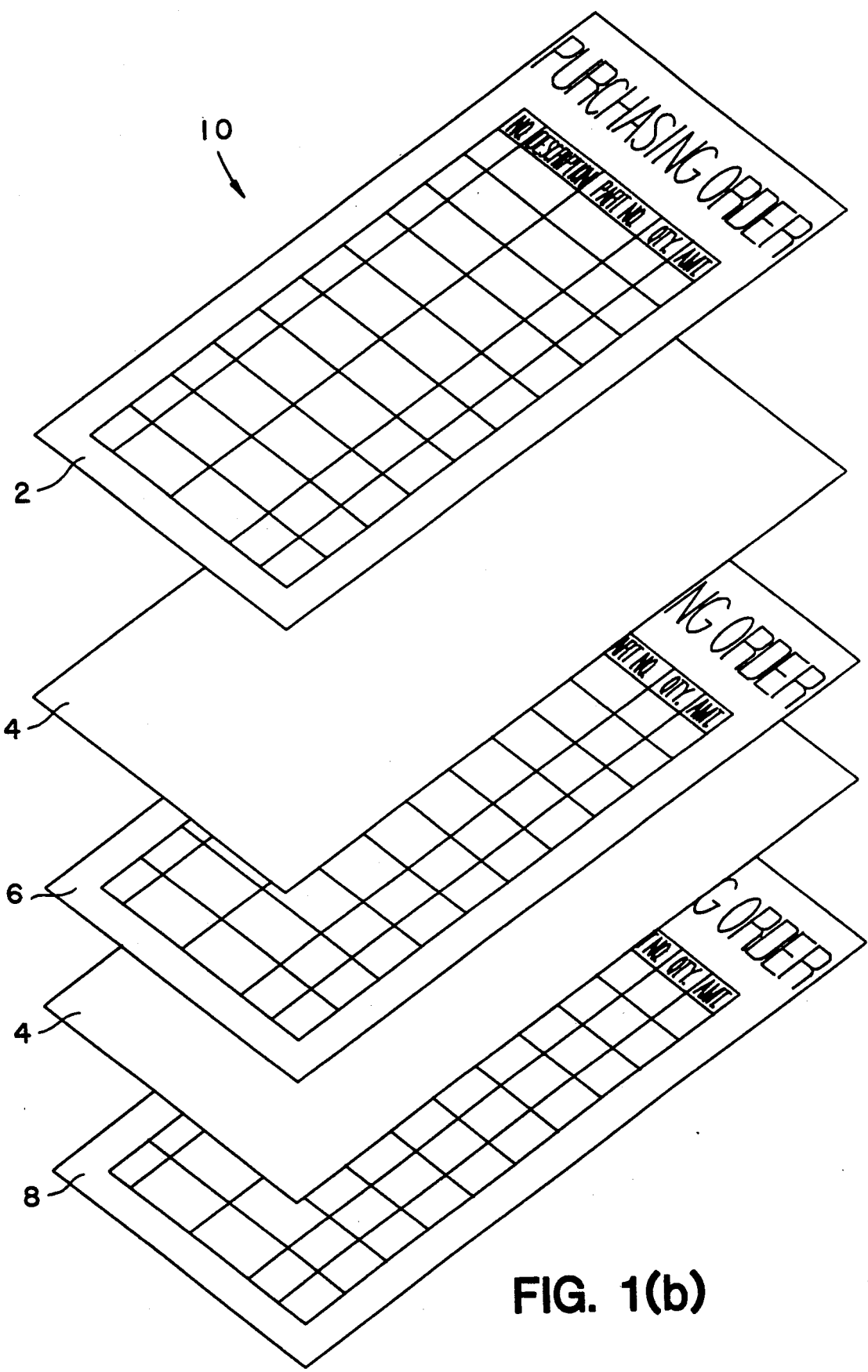
Figure 2B:
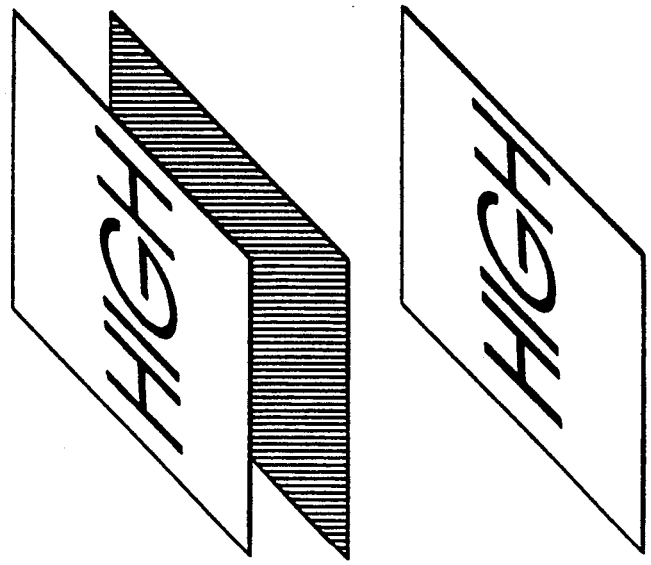
FIGS. 2(a) and 2(b) respectively are diagrams illustrating the typing result on a set of copy forms when the impression pressure is low and high.
Figure 2A:
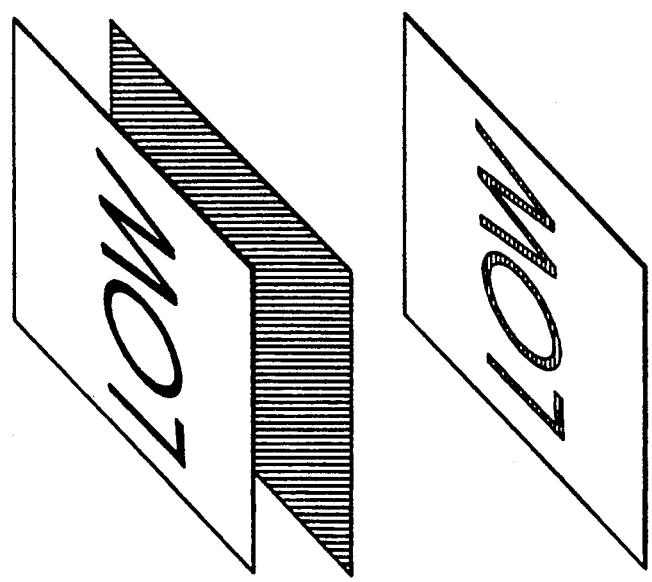

The processor 14 controls the carrier unit 16 to print characters with a plurality of impression pressures including a high impression pressure sufficient for printing on all of the sheets of a set of copy sheets, such as is illustrated in FIG. 1(b). It should be noted that as used in this application, the term "copy sheets" refers to a plurality of sheets which have the property that when they are placed together and when the top sheet is printed on with an impact-type typewriter or printer, the remaining sheets will also be printed with the same characters printed on the top sheet. This term, therefore, includes sheets of paper separated by carbon paper, as well as carbonless sheets that permit copies to be made on the lower sheets when the top sheet is impacted by a letter plate without the use of carbon paper. The user can select one of the plurality of impression pressures via the "IMP MULTI" key on the keyboard 18 when the device operates in a normal operation mode. The processor 14 also switches the device between this normal operation mode and a copy mode of operation. In the normal operation mode the device is capable of printing in any of the plurality of impression pressures selected by the operator. In copy mode the processor 14 instructs the carrier unit 16 to print only with a high pressure sufficient for printing on all of the sheets of the set of copy sheets placed in the typewriter 12. The operator can switch the device between the normal operation mode and the copy mode by operating two keys simultaneously on the keyboard unit 18, as will be discussed below. When the operator switches the device from the copy mode to the normal mode, the processor 14 instructs the carrier unit 16 to print with the impression pressure previously set when the device had previously functioned in the normal mode.

As will be discussed below, the processor 14 instructs the carrier unit 16 to perform an overstrike operation on a previously printed character in response to pressing a delete key on the keyboard unit 18 when the device operates in the copy mode. In addition, the processor 14 instructs the carrier unit 16 to perform an erasing operation to erase a previously printed character in response to pressing the delete key on the keyboard unit 18 when the device operates in the normal mode, as will be further discussed below.

The processor 14 can also switch the device into and out of a character overstrike selecting mode for selecting a character to overstrike the previously printed character. The processor 14 performs this switching operation in response to the user depressing two keys simultaneously on the keyboard unit 18. When the processor 14 so places the typewriter 12 into the character overstrike selecting mode a character will be stored in a random access memory 40 of the processor 14 when the corresponding character key is depressed. It is this character stored in the memory that is used for overstriking when the user depresses the delete key on the keyboard unit 18 and when the processor 14 has placed the typewriter 12 into the copy mode, as will be discussed in more detail below.

Power is supplied to the processor 14 by a power supply unit 26, which receives power from an AC input plug 20. Plug 20 is connected to unit 26 by a power transformer 22, and a power cord connector 24. Power supply unit 26 comprises a 24 volt regulator 28 and an 8 volt regulator 30. Power supply unit 26 supplies power to a voltage regulator 38 through an interface terminal 32. Voltage regulator 38 supplies 5 volts to the processor 14 to power the processor. The processor 14 is on one printed circuit board.

Figure 7:
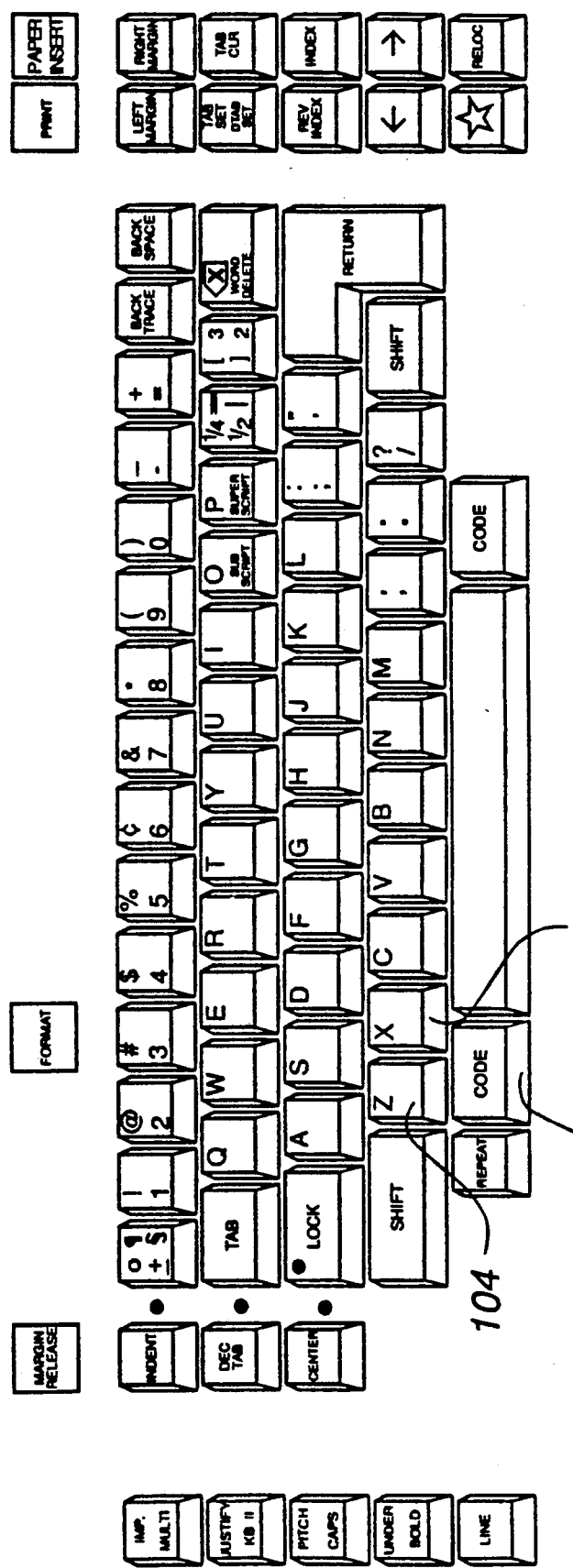
FIG. 7 shows a top plan view of the keyboard of the typewriter of the present invention.

Keyboard unit 18 supplies information to and receives information from an interface terminal 34. A microprocessing unit 42 transmits address signals through address lines KS0 through KS7 to the interface terminal 34 to scan the keyboard unit 18. In the response to the scan, the keyboard unit 18 transmits signals to the interface terminal 34, which transmits address signals through address lines KD0 through KD7 to a microprocessing unit (MPU) 42, as is known in the art. Keyboard unit 18 also receives data signals through data lines D0 through D3 from a data bus 54 for controlling the lighting of four light emitting diodes (LED's) on the keyboard unit 18 adjacent an INDENT key, a DECTAB key, a CENTER key, and a LOCK key, as shown in FIG. 7.

Figure 8B:
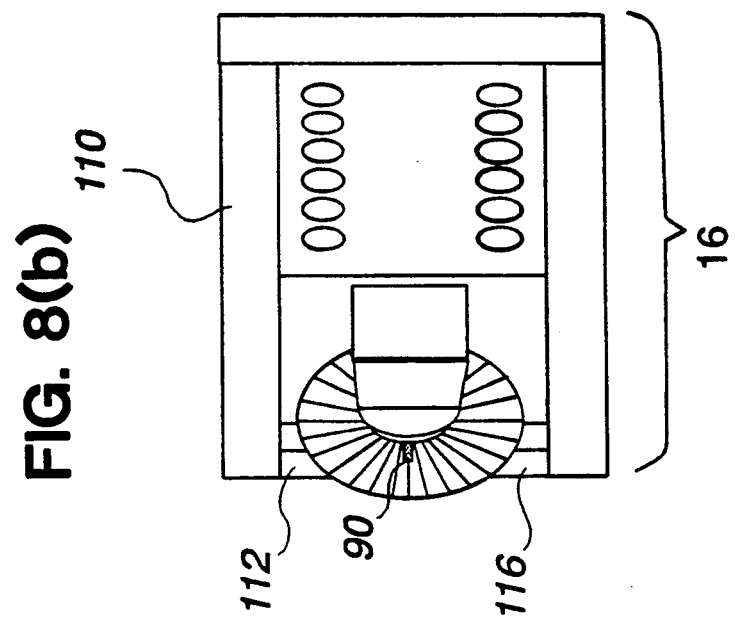
FIG. 8(b) shows the cassette of the present invention.

Carrier unit 16 comprises, in part, an up-left/down switch 33 for determining the standard horizontal position of the carrier unit 16 and the standard vertical position of a ribbon cassette 110 (FIG. 8(b)). Data generated by this sensor is transmitted to the MPU 42. When the user turns on the typewriter 12, the MPU 42 performs an initialization process to initialize the typewriter 12. During this process the two types of data noted above are generated sequentially by switch 33. In addition, the carrier unit 16 comprises a hammer sensor 35 for detecting the hammer position. The hammer sensor 35 generates two signals when a hammer 90 rebounds from having hit one of the ninety-six letter plates 112 of a daisy wheel. These signals are transmitted to MPU 42 which uses them to brake the hammer 90 using a hammer solenoid (not shown), as is known in the art. The carrier unit also comprises a wheel index sensor 37 for detecting the standard point for a daisy wheel comprising ninety-six letter plates 112 shown in FIG. 8(b). The switch 33 transmits an up-left/down signal UL/D to an up-left/down terminal of the MPU 42 through an interface terminal 36. The hammer sensor 35 transmits an analog hammer sensor signal to a comparator 44 via the interface terminal 36. Comparator 44 converts the analog signal to a digital hammer sensor signal HMR SNS and transmits it to the MPU 42. The wheel index sensor 37 transmits a wheel index signal to a transistor 46 through the interface terminal 36, and the transistor 46 transmits a wheel index signal WIX to MPU 42.

The MPU 42 controls the operation of all of the elements of the apparatus included in the processor 14, the carrier unit 16, and the keyboard unit 18, as is known to those skilled in the art. MPU is a microprocessing unit model #HD6303YP made by Hitachi.

MPU 42 transmits and receives data to and from the data bus 54 and to and from an address bus 52. Specifically, MPU 42 transmits and receives address data through address lines signals A0 through A15 to and from the address bus 52 and transmits and receives data signals through data lines D0 through D7 to and from the data bus 54. In addition, the MPU 42 receives clock pulses from a crystal controlled oscillator 60 and transmits these clock pulses to a CLK terminal of a gate array 58. Oscillator 60 operates at a 1 MHZ frequency to provide a clock for MPU 42. Reset signals are transmitted from the RES terminal of the gate array 58 and are received at the terminal RST of the MPU 42. Gate array 58 is model #HG61H06B31P made by Hitachi.

Also provided is a country code selection circuit 61, connected to the MPU 42 and the address bus 52. This circuit permits fifteen different keyboard units of different languages to be used with processor 14 and carrier unit 16.

The processor 14 further comprises a system random access memory (RAM) 40. RAM 40 maintains the essential memory areas and the input data for the operation on of the MPU 42. RAM 40 is model #μPD4364CX made by NEC.

RAM 40 receives and transmits address signals through address lines A0 through A12 to and from the address bus 52 and transmits and receives data signals through data lines D0 through D8 to and from data bus 54. RAM 40 comprises an OE terminal and a WR terminal for receiving signals from MPU 42. RAM 40 further comprises a CE1 terminal for receiving data from a RAM SC terminal of the gate array 58. In addition, RAM 40 receives a CE 2 signal transmitted by the gate array 58 as a CE1 signal through an enable control 56.

The processor 14 further includes a 32 kilobyte system read only memory (ROM) 48 which stores the control procedures to be carried out by the MPU 42. ROM 48 comprises a CE terminal for receiving data from the gate array 58. In addition, ROM 48 transmits and receives address signals through address lines A0 through A14 to and from the address bus 52 and data signals through data lines D0 through D7 to and from the data bus 54.

The processor 14 further comprises an 8 bit latch 50, model #SN54LS373 made by Texas Instruments, comprising eight flip flops, which is placed in a data line connecting the data bus 54 with the interface terminal 34. The register 50 stores signals received from keyboard unit 18 and data bus 54 to control LED's on the keyboard unit 18. Data transmitted through data lines D0 through D3 control the light emitting diodes on the keyboard unit 18.

The gate array 58 performs two-way communication with the data bus 54 so as to transmit and receive data signals through data lines D0 through D7, and with address bus 52 to transmit and receive address signals through address lines A3 through A15. Also provided is a buzzer 62, which is connected to the gate array 58 for providing an alarm when the operator performs an impermissible operation.

The gate array 58 also includes a terminal for receiving a reset signal from a reset circuit 66. The gate array 58 transmits: feed motor signals FMI through FM4 to a feed motor driver 68; carrier motor signals CM1 through CM4 to a carrier motor driver 70; and wheel motor signals WM1 through WM4 to a wheel motor driver 72.

The circles on the exterior of MPU 42, RAM 40, RAM 48, and gate array 58 indicate negative logic input into MPU 42, RAM 40, RAM 48, and gate array 58, respectively.

Processor 14 further comprises a hammer control circuit 74 which receives a hammer control signal HMR from the MPU 42. The MPU 42 instructs hammer control circuit 74 to control hammer 90 to print with a plurality of impression pressures as chosen by the user by depressing a key on the keyboard unit 18. One of these impression pressures is a high impression pressure, to print on a top form 2 and through to a bottom form 8 of a set of copy forms comprising the top form 2, two sheets of carbon pages 4,4, positioned between the top form 2 and a middle form 6, and between the middle form 6 and the bottom form 8, as shown in FIG. 1(b).

The gate array 58 also transmits a motor enable driver signal to a motor enable driver 64. Motor enable driver 64, in turn, transmits a carrier motor driver enable signal CME to the carrier motor driver 70, and a wheel motor driver enable signal WME to the wheel motor driver 72. The motor enable driver 64 also sends a clutch solenoid signal CLTSOL to an interface terminal 82 connected to a clutch solenoid 92. The clutch solenoid 92 engages a gear (not shown) connected to a feed motor 84 and a platen (not shown) for facilitating feeding of the recording paper, as is known to those skilled in the art. The clutch solenoid changes the direction of the driving force of the feed motor 84 as is also well known to those skilled in the art.

An interface terminal 76 connects the feed motor driver 68 with a feed motor 84. The feed motor 84 rotates the platen and rewinds the ribbon, as is well known to those skilled in the art. An interface terminal 78 connects the carrier motor driver 70 with a carrier motor 86. An interface terminal 80 connects the wheel motor driver 72 with a wheel motor 88, and connects the hammer control circuit 74 with a hammer 90. Feed motor 84, carrier motor 86, and wheel motor 88 are pulse motors. Feed motor 84 is adapted to feed recording paper through the typewriter 12 and rewind a ribbon, as is well known to those skilled in the art. Carrier motor 86 drives the carrier unit 16 as is well known to those skilled in the art. Wheel motor 88 drives the daisy wheel, as is well known to those skilled in the art. The hammer control circuit 74 controls the operation of the hammer to strike the letter plates 112 (FIG. 8(b)) of the daisy wheel, so that a character on the letter plate strikes a ribbon 116 (FIGS. 8(a) and 8(b)) to type that character on a recording medium, as is well known to those skilled in the art.

When the operator operates the keyboard unit 18 by inputting a character, the processing of the character is controlled by the MPU 42. The MPU 42 issues a plurality of control commands for controlling the carrier unit 16 to print the character. These control commands are sent by means of the gate array 58 to each of the motor enable driver 64, the feed motor driver 68, the carrier motor driver 70, the wheel motor driver 72, and the hammer control circuit 74. In turn, these drivers and circuits control or drive the feed motor 84, the carrier motor 86, the wheel motor 88, the hammer 90, and the clutch solenoid 92 according to the control commands issued by the MPU 42, as is well known to those skilled in the art.

Along with this series of actions, the character information which has been input by the keyboard 18 is recorded in the RAM 40.

Figure 6B:
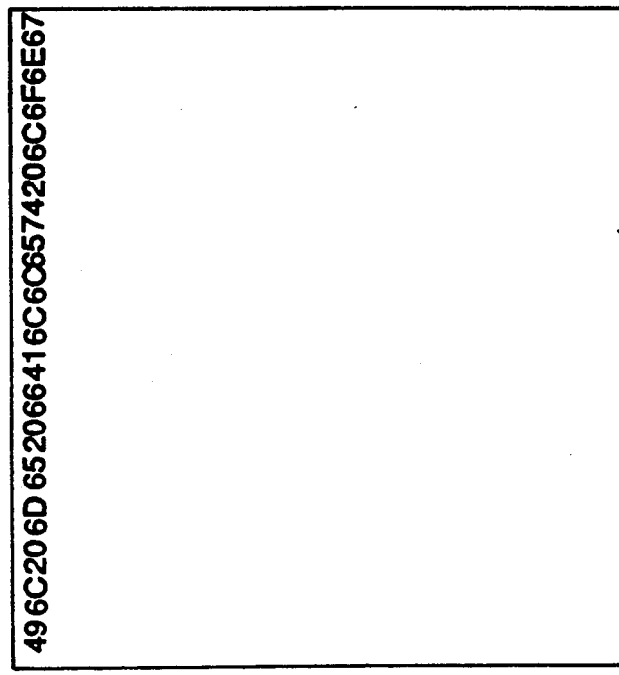
FIG. 6(b) shows the contents of the RAM of the processor of the present invention corresponding to the characters printed in FIG. 6(a)
Figure 6A:
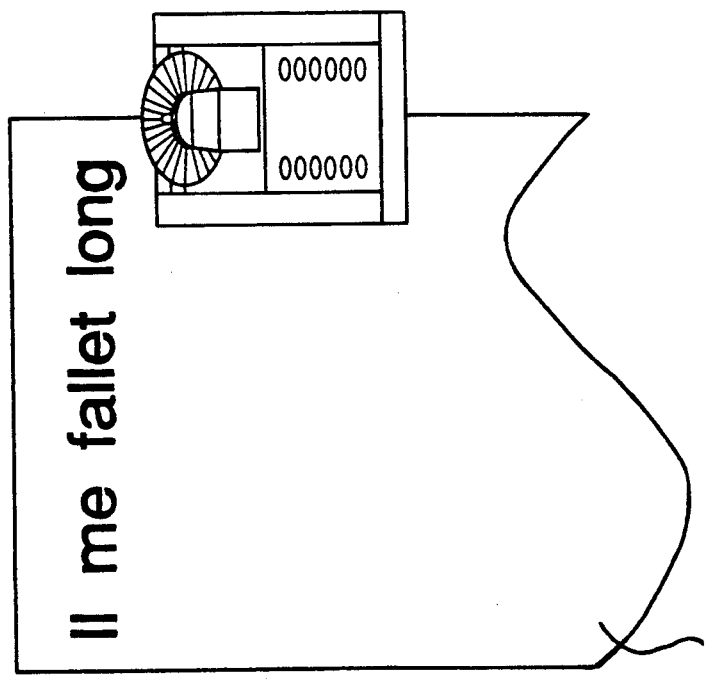
FIG. 6(a) shows a sheet of paper having characters printed thereon and a cassette of the typewriter of the present invention.

The relationship between the printed character and the character information stored in RAM 40 is shown in FIGS. 6(a) and 6(b). FIG. 6(a) shows characters printed on the surface of a page and a portion of the carrier unit which printed the characters shown therein and which comprises a wheel motor 88 and hammer 90. FIG. 6(b) shows in hexadecimal notation, a representation of the printed characters as stored in the RAM 40. A code positioned in the center of the series of numbers in FIG. 6(b) is an access code corresponding to the characters of FIG. 6(a).

Figure 12:
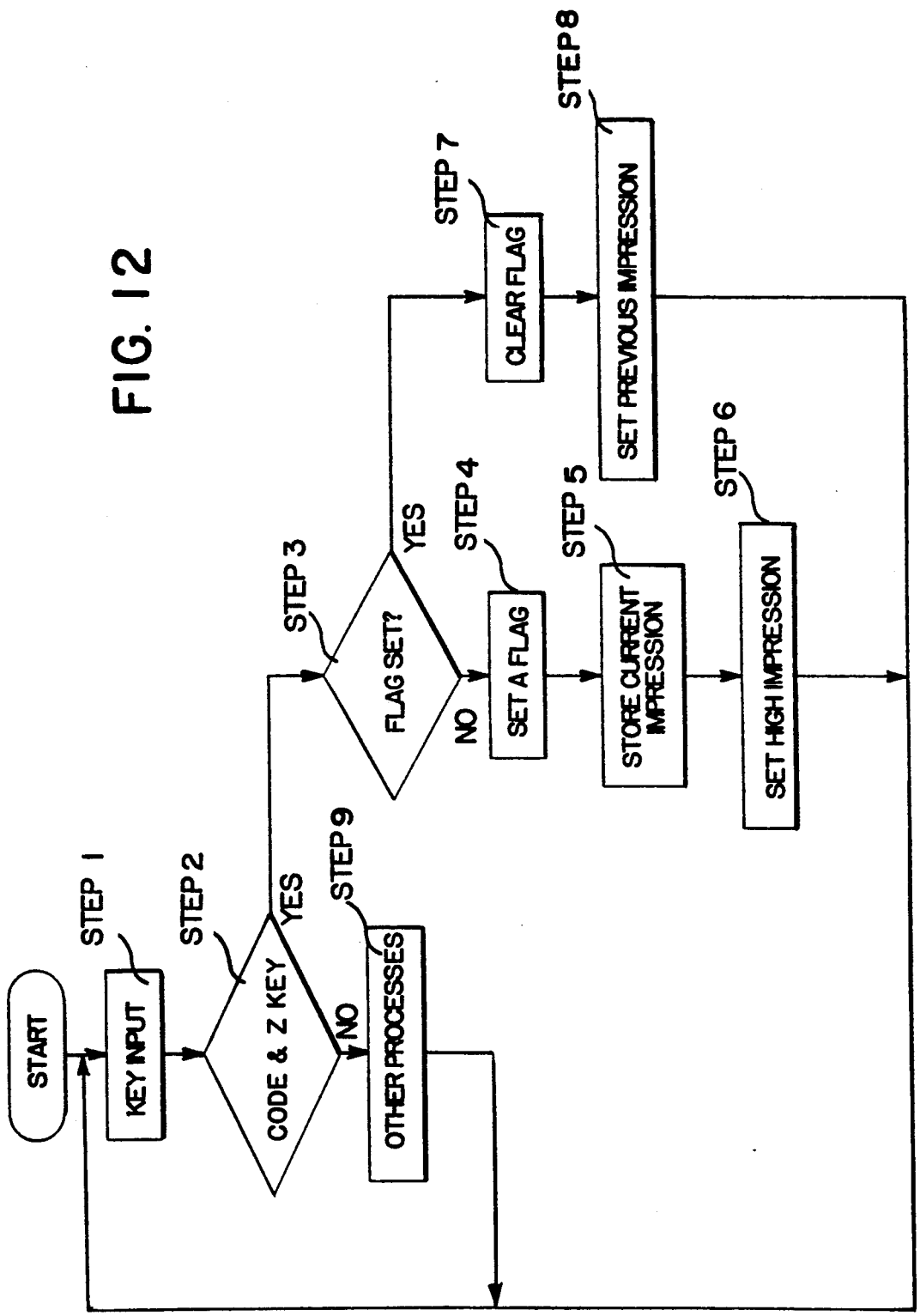
FIG. 12 is a flowchart showing the procedure for setting the typewriter of the present invention in a mode in which a high pressure impression is made.

In order to successfully print on a set of copy forms, the operator changes the mode of the typewriter 12 from a normal mode in which a plurality of impression pressures can be used, to a copy mode for printing only with a high impression pressure. This is done by pressing a CODE key 102 simultaneously with character key "Z" 104, as shown in FIG. 7. This process is shown in the flowchart of FIG. 12. When the CODE key 102 and the character key "Z" 104 are pressed again the mode changes back to the normal mode.

First, in STEP 1 key input information is entered into the typewriter by pressing the keys on the keyboard unit 18. In STEP 2 the MPU 42 determines whether the CODE key 102 and the "Z" key 104 have been pressed simultaneously. If the answer is no, the next step is STEP 9, in which other processes of the typewriter are performed. If the answer is yes, the process proceeds to STEP 3 in which the MPU 42 checks whether a flag has been set by the MPU in RAM 40. The setting of the flag indicates that the apparatus has been placed in a mode for requiring printing with a high impression pressure on a set of copy forms. If this flag is not set, the typewriter 12 is not in this mode for printing on a set of copy forms. Rather, the typewriter 12 is in the normal operation mode. As a result, the method proceeds to STEP 4 in which the flag is then set by the MPU 42. The current impression pressure set in the normal mode, is stored in an area of one portion of the RAM 40. This is done in STEP 5. Once this current impression pressure set in the normal mode has been stored, the process proceeds to STEP 6 in which a high impression pressure in the copy mode is set. If the MPU 42 determines that the flag has been set in STEP 3, the typewriter 12 is already operating in the copy mode. As a result, the method proceeds to STEP 7 in which the flag is cleared, and then to STEP 8 in which the previous impression pressure for operating in a normal mode is set.

Figure 13:
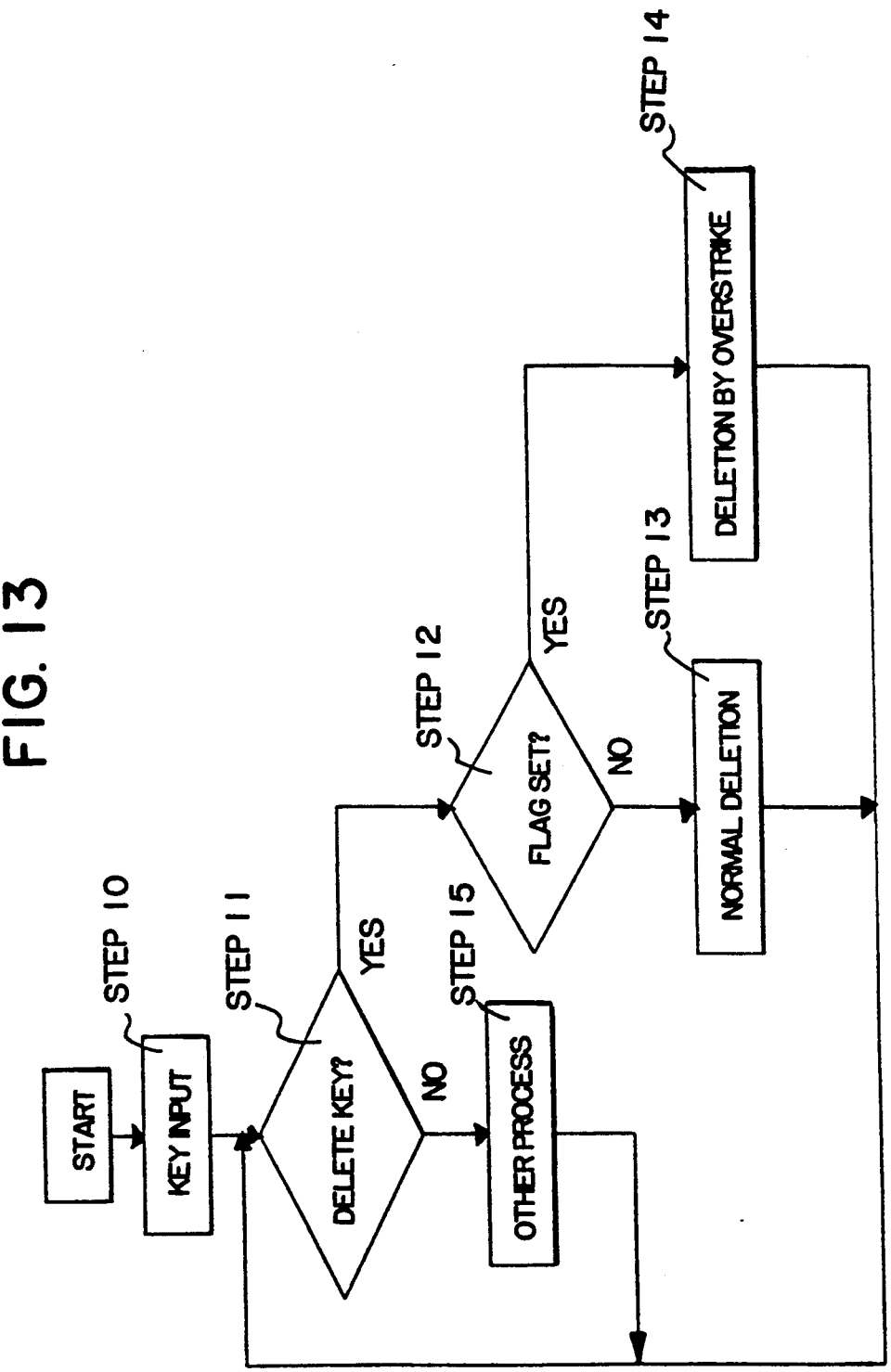
FIG. 13 is a flowchart of a process in which automatic correction is performed by overstriking or erasing.

FIG. 13 shows the procedure for correcting an incorrectly typed character. The typewriter 12 can handle the correction of this character in two ways. First, if the character is printed on a single sheet of paper, the typewriter can operate in a normal deletion mode in which the incorrectly printed character is erased. The typewriter 12 can also be placed into an overstrike mode for correcting a character printed on a plurality of sheets of a set of copy forms. In this mode, correction is performed by overstriking the incorrectly printed characters on the set of copy forms. Both of these modes are set by pressing a delete key 100, as shown in FIG. 7.

Figure 8A:
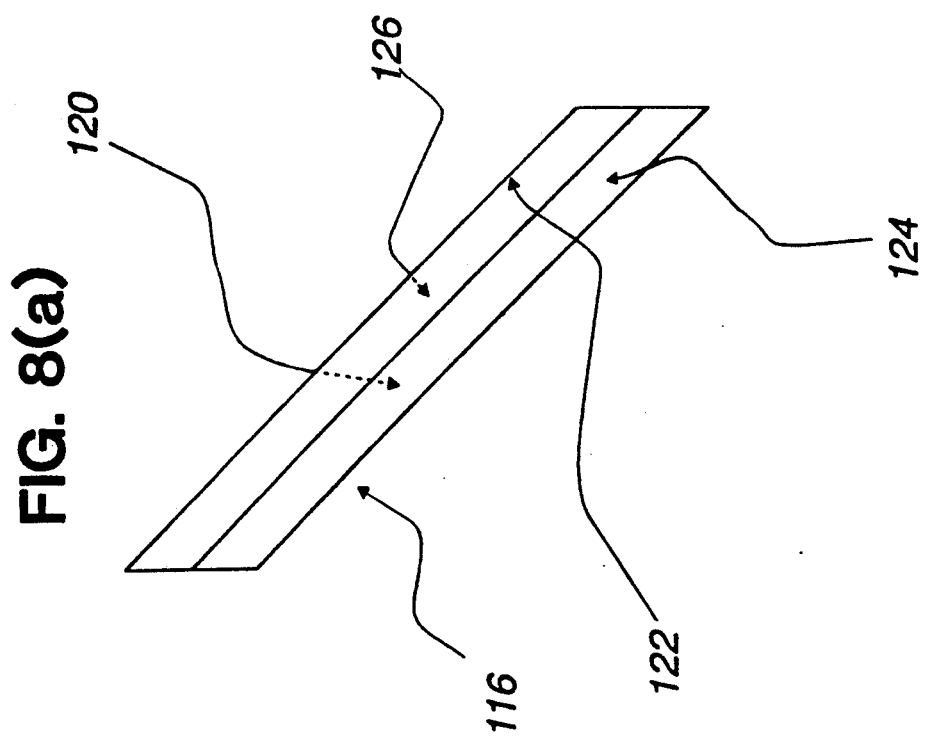
FIG. 8(a) shows a ribbon of the present invention.

When the delete key 100 is pressed the typewriter 12 automatically corrects the error on the surface of the recording paper. This is done using the ribbon 116 shown in FIGS. 8(a) and 8(b). The ribbon 116 is supplied from a ribbon cassette 110 attached to the carrier unit 16. During either typing or deleting, a character on the letter plate 112 strikes the back surface 120 of the ribbon 116 in response to being struck by a hammer 90. Ribbon 116, in addition to comprising a back surface 120, also includes an inked surface 122 having a back surface 126, and an adhesive surface 124, as shown in FIG. 8(a). In response to being struck by the letter plate 112, either the ink surface 122 or the adhesive surface 124 of the ribbon 116 contacts the paper used for typing. The adhesive surface 124 is aligned with the typed character to be deleted by the carrier motor 86 and the wheel motor 88 controlled by the MPU 42, as is well known to those skilled in the art. The same character that is to be erased is selected from the various letters stored on the daisy wheel in ninety-six letter plates 112 and is interposed behind the ribbon 116 and aligned with the character to be deleted by the carrier motor 86 and the wheel motor 88 controlled by the MPU 42, as is well known to those skilled in the art. By striking the back surface of the letter plate 112 with the hammer 90, the adhesive surface 124 of the ribbon 116 strips the ink from the character to be deleted that is printed on the paper. As a result, the printed character is deleted. This series of actions is illustrated in FIG. 9(a)(1)-9(c)(2).

The data stored in the RAM 40 is shown in FIGS. 9(a)(2)-9(c)(2). The data stored in the RAM 40 which is illustrated in FIG. 9(a)(2) corresponds to the printed result in FIG. 9(a)(1). The same is true of FIG. 9(b)(2), which corresponds to the printed result shown in FIG. 9(b)(1) and to FIG. 9(c)(2) which corresponds to the printed result shown in FIG. 9(c)(1). Thus, in FIG. 9(a)(1) the operator has incorrectly typed "lonh". The access code for "h" is "68H", which has been stored in the RAM 40. For this reason, the pressing of the delete key results in erasing the "68H" in the RAM 40 along the "h" printed on the paper, as illustrated in FIGS. 9(b)(1) and 9(b)(2). By printing "g", as in FIG. 9(c)(1), the correctly spelled word "long" is printed and the access code for "g", which is "67H", is stored in the RAM 40, as shown in FIG. 9(c)(2). As was explained with regard to FIG. 6, the appropriate letter is chosen from the letter plate when erasing the typed characters, since the electronic typewriter stores the characters which have been previously input. In other words, when the "h" is erased, this is automatically done with an "h" chosen from the letter plate 112.

Next, the operation of normal deletion and deletion by overstrike will be explained with reference to FIG. 13. At STEP 10 a key input is performed for inputting information into the typewriter 12. Next, in STEP 11 the MPU 42 determines whether the key input is the delete key. If it is not the delete key, the process proceeds to STEP 15 in which other processes of the typewriter 12 are performed. If the delete key has been depressed, the method proceeds to STEP 12, in which the MPU 42 determines whether the flag discussed above with respect to the flowchart in FIG. 12 has been set. If the flag has been set, the typewriter 12 is placed in an overstrike mode in which correction of the incorrectly typed character or characters is performed by overstriking the character or characters, which have been stored in the RAM 40. This is performed in STEP 14 and requires the use of the inked portion 122 of the ribbon 116. If the MPU 42 determines that the flag has not been set, the process proceeds to STEP 13 in which the typewriter 12 is placed in a normal deletion mode. In this mode, adhesive portion 124 of the ribbon 116 is used to erase a character printed on a sheet of paper.

When correction is performed in the overstrike mode, the data stored in the RAM 40 is different from the data stored in the RAM 40 in a normal erasure mode as illustrated in FIG. 9(a)(1)-FIG. 9(c)(2). This is shown in FIG. 10. The three sets of data in the RAM 40 shown in FIG. 10(b) corresponds to the three "12's" shown in FIG. 10(a). The data shown in FIG. 10(b) are access codes which correspond to the typed characters in FIG. 10(a). Thus, when "12" is typed on the surface sheet of the set of copy forms, "12" is duplicated on the pages at or below the second sheet as is also illustrated in FIG. 10(a). The access code corresponding to "12" are stored in RAM 40. When the delete key 100 is pressed, an "X" is typed on the surface sheet and on the second or later sheet along with an overstrike of the character "X" on the "2" on the surface sheet. The access codes stored in the RAM 40 represent the "2" and the overstriked "X". "F0" denotes the beginning of the overstrike letters, and "F1" denotes the end of the overstrike letters. In addition, "58" represents the overstrike letter "X".

Figure 14:
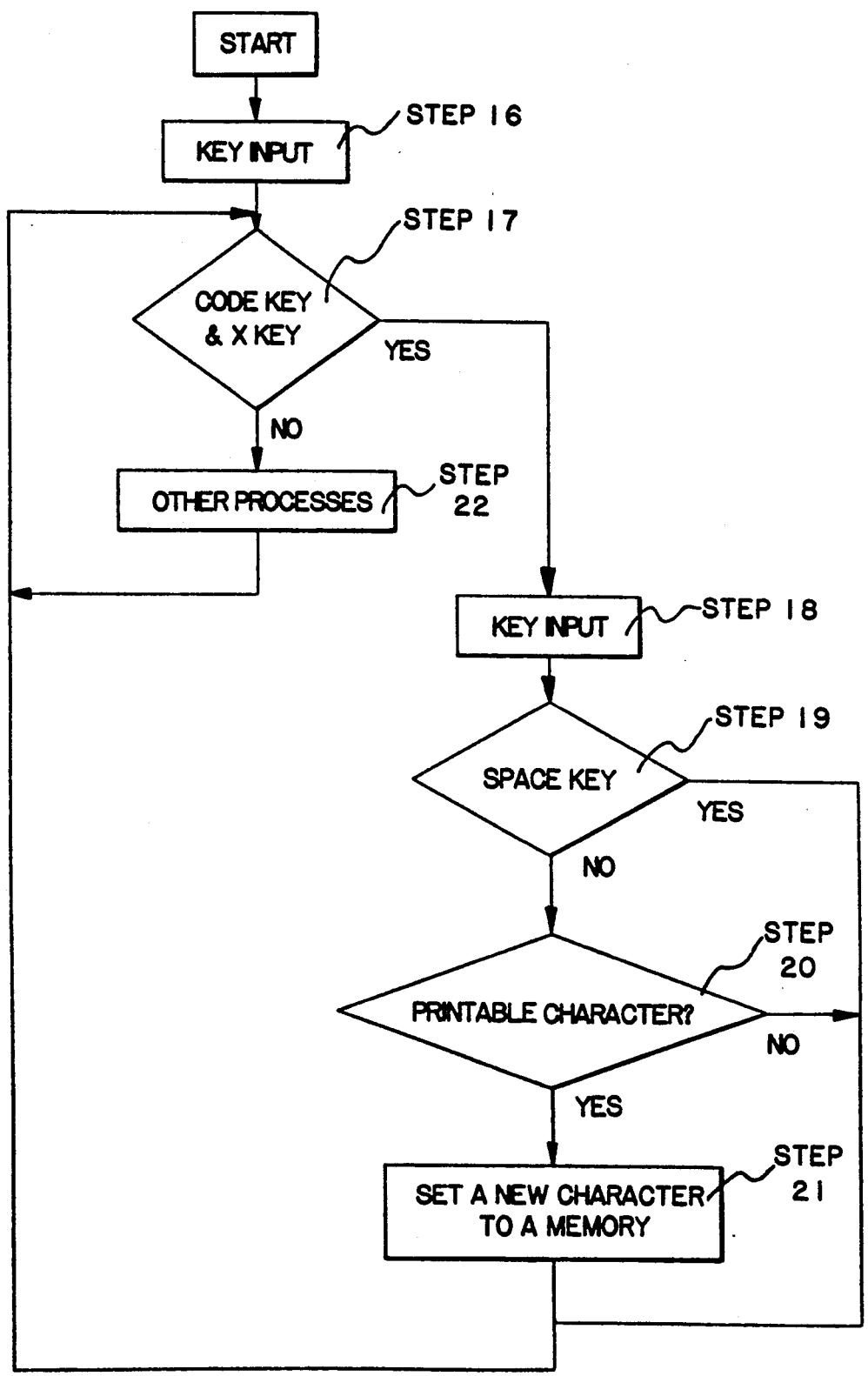
FIG. 14 is a flowchart showing the enablement of a mode in which overstriking is performed using any one of a plurality of characters.

FIG. 14 shows the process by which the typewriter permits the operator to choose any character to perform the overstriking operation. This is done by placing the typewriter in a character selecting overstrike mode as will now be discussed. In STEP 16 a key input is performed for inputting data into the typewriter 12. In STEP 17 the MPU 42 determines whether the key input comprises the simultaneous input of the CODE key 102 and the "X" key 106, as illustrated in FIG. 7. If these keys were not simultaneously pressed, the process proceeds to STEP 22 in which other processes of the typewriter 12 are performed. If these keys were simultaneously pressed, the typewriter 12 enters a character selecting overstrike mode in which any printable character can be set for overstriking. Specifically, the process proceeds to STEP 18 in which a key input is performed. This key input is for inputting a character to be used in an overstriking operation. Next, the MPU 42 determines in STEP 19 whether the key input is a "space" key, since this has no significance for overstriking. If a "space" key has been pressed, the procedure is terminated without any new action being performed. If the key input was not a "space" key, the process continues to STEP 20, where the MPU 42 determines whether the key input was a printable character. If the key input did not represent a printable character, (for example, if a function key was pressed) the process is terminated and no new action is performed. If however, MPU 42 determines that the key input represented a printable character, the process proceeds to STEP 21 in which this key input is set and recorded in a given area of the RAM 40. Simultaneously pressing the CODE key 102 and the "X" key 106 again takes the typewriter out of this character selecting overstrike mode and permits normal typing or correcting operations to be performed. When the operator then presses the delete key when the flag is set, after the CODE key 102 and the "X" key 106 have again been simultaneously pressed, an overstrike is performed using this character. The results of these operations are seen in FIG. 11. In FIG. 11, when a "X" is selected, this "X" is struck over "$777.77". On the other hand, if a "=" is selected, a plurality of "=" are struck over the "$777.77".

As a result of this structure, the typewriter 12 can be easily adapted to successfully type on a single sheet paper or on a set of copy forms without requiring the operator to perform complicated operations. Rather, the operator need only press several keys on the keyboard to place the typewriter 12 into a mode in which the impression pressure of the hammer 90 will be automatically set to print on the set of copy forms. In addition, the typewriter can also perform a normal erasure operation on an incorrectly typed character, or an overstrike operation (suitable for correcting errors printed on a set of copy forms). Either of these operations can be easily carried out by depressing the delete key. The operator can also select any printable character to be used for the overstriking operation by simply depressing two keys on the keyboard and the key to be set. Consequently, this typewriter has greatly increased typing capabilities when compared to conventional typewriters, reduces operator errors, and has a low cost.

Individual components represented by the blocks shown in FIG. 5 are well known in the printing art and their specific construction and operation is not critical to the operation of the invention or the best mode for carrying out the invention. Moreover, the steps illustrated in FIGS. 12 through 14 can be easily programmed into well known processors or microprocessing units by persons of ordinary skill and since such programming per se is not part of this invention, no further description thereof is deemed necessary.

Although the preferred embodiments of the present invention have been disclosed herein for purposes of explanation, the invention is not limited to the details described above; various modifications thereof will become apparent to those skilled in the art to which the invention pertains.

We claim:

1. An impact-type printing device for printing in a normal and copy modes of operation, comprising:
    means for printing a character with a plurality of impression pressures including a high impression pressure sufficient for printing on all the sheets of a set of copy sheets;
    selecting means for manually selecting one of a plurality of impression pressures when said device operates in the normal mode; and
    means for manually switching said device between the normal operation mode and a copy mode of operation, wherein in the normal mode said printing means is capable of printing with nay of said plurality of impression pressures selected by said selecting means, wherein in the copy mode said printing means prints only with the high pressure sufficient for printing on all of the sheets of the set of copy sheets, and wherein said manual switching means comprises a separate component or components from said selecting means.

2. The device recited in claim 1, further comprising means for selecting one of the plurality of impression pressures when said device operates in the normal mode, wherein said selecting means selects a first impression pressure in the normal operation mode, and wherein when said switching means switches said device from the copy mode to the normal mode, said printing means prints with the first impression pressure previously set by said selecting means.

3. The device recited in claim 2, further comprising means for performing an overstrike operation on a previously printed character printed by said printing means when said device operates in the copy mode.

4. The device recited in claim 3, further comprising:
    manual actuating means for manually actuating said printing means to perform an overstrike operation, wherein said printing means performs an overstrike operation on the printed character in response to the operation of said manual actuation means and when said device operates in the copy mode.

5. The device recited in claim 4, further comprising means for performing an erasing operation for erasing the printed character.

6. The device recited in claim 5, wherein said erasing means performs an erasing operation in response to the operation of said manual actuation means and when said device operates in the normal mode.

7. The device recited in claim 5, further comprising a ribbon having an inked portion and an adhesive portion, wherein said printing means operates on said inked portion of said ribbon and said erasing means operates on said adhesive portion of said ribbon.

8. An impact-type printing device comprising:
    a keyboard comprising a plurality of keys and an impression pressure element and at least one mode selection element;
    a carrier unit; and
    a processor electrically connected to said carrier unit and said keyboard, said processor switching said device between a normal operation mode and a copy mode of operation in response to the actuation of said at least one mode selection element, wherein in the normal mode said device is capable of printing with a plurality of impression pressures selected by said impression pressure element, and wherein in the copy mode said device prints only with a high impression pressure sufficient for printing on all the sheets of a set of copy sheets, said carrier unit comprising:
- a hammer;
- a hammer control circuit connected to said processor and said hammer;
- a ribbon; and
- a daisy wheel comprising a letter plate adapted to be positioned between said hammer and said ribbon, wherein said hammer is displaceable to strike said letter plate, wherein said letter plate is displaceable to press said ribbon against a recording medium with a plurality of impression pressures including a high impression pressure sufficient for printing on all the sheets of a set of copy sheets in response to being struck by said hammer, wherein said processor selects one of the plurality of impression pressures in response to the actuation of said impression element and in response to said at least one mode selection element inputting a signal to said processor indicating the selection of the normal mode, and wherein said processor selects the high impression pressure in response to said at least one mode selection element inputting a signal indicating the selection of the copy mode, and wherein said hammer strikes said letter plate with the high impression pressure in response to receiving a signal from said hammer control circuit generated in response to a signal from said processor when in the copy mode and said hammer strikes said letter plate with an impression pressure selected in response to actuation of said impression pressure element when said device operates in the normal mode.

9. The device recited in claim 8, wherein after said processor switches said device from the normal mode in which a first impression pressure was selected to the copy mode and then back to the normal mode in response to signals from said at least one mode selection element, said processor instructs said hammer control circuit to control said hammer to strike said letter plate with the previously selected first impression pressure.

10. The device recited in claim 9, wherein said processor instructs said hammer, said letter plate, and said ribbon to perform an overstrike operation on a character previously printed by said device when said device operates in the copy mode.

11. The device recited in claim 10, wherein said keyboard further comprises a correction key for instructing said processor to actuate an overstrike operation, wherein said hammer, said letter plate, and said ribbon perform an overstrike operation on the previously printed character in response to the operation of said correction key and when said processor instructs said device to operate in the copy mode.

12. The device recited in claim 11, wherein said ribbon comprises an inked portion and an erasing portion, wherein said device further comprises a carrier unit motor and a daisy wheel motor, wherein said processor controls said carrier unit motor and said daisy wheel motor to align said erasing portion of said ribbon and a character on said letter plate with the previously printed character to permit an erasing operation to be performed, and wherein said processor controls said carrier unit motor and said daisy wheel motor to align said inked portion of said ribbon and a character on said letter plate with the previously printed character to permit an overstrike operation to be performed, wherein said carrier unit motor and said daisy wheel motor align said erasing portion and a character on said letter plate with the previously printed character and said processor instructs said hammer control circuit to instruct said hammer to strike said letter plate in response to the operation of said correction key and when said device operates in the normal mode, wherein said carrier unit motor and said daisy wheel motor align said inked portion and a character on said letter plate with the previously printed character and said processor instructs said hammer control circuit to instruct said hammer to strike said letter plate in response to the operation of said correction key and when said device operates in the copy mode.

13. A method of printing using an impact-type printing device comprising the steps of:
- manually setting the device to operate in a normal mode with an element or elements of the impact-type printing device;
- manually selecting one of a plurality of impression pressures with which printing of a character will occur when the device is set to operate in the normal mode in said setting step with an element or elements of the impact-type printing device different from the element or elements used in said manual setting step;
- printing with the selected impression pressure in the normal mode, wherein said normal mode manual setting step of said normal mode printing step comprise a first pair of steps;
- manually setting the device to operate in a copy mode in which printing of the character can occur only with a high impression pressure sufficient for printing on all of the sheets of a set of copy sheets with an element or elements of the impact-type printing device different from the element or elements used in said manual selecting step; and
- printing with the high pressure in the copy mode, wherein said copy setting step and said copy printing step comprise a second pair of steps,
wherein said two pairs of setting and printing steps can occur in any order with respect to each other.

14. The method recited in claim 13, wherein said normal mode setting step occurs before said copy mode setting step, wherein said selecting step selects a first impression pressure, and wherein said method further comprises the step of switching the operating mode of the device back to the normal mode after said copy mode setting step and automatically setting the previously selected first impression pressure after said copy mode setting step.

15. The method of recited in claim 14 further comprising the step of:
- performing an overstrike operation on a printed character in response to said copy mode setting step being performed.

16. The method recited in claim 15, further comprising the step of:
- manually actuating a first key on the printing device, wherein said overstrike operation step is performed in response to the performing of said manual actuation step and the performing of the copy setting step.

17. The method recited in claim 16, further comprising the step of:
erasing a printed character in response to the performing of said manual actuation step and said normal mode setting step.

18. The method recited in claim 17, further comprising the step of:
manually actuating an element on the printing device to switch said device between the normal mode and the copy mode.

19. A printing device comprising:
means for switching said device between a normal mode in which printing occurs with any one of a plurality of impression pressures and a copy mode in which printing occurs only with a high impression pressure sufficient to print on all of the sheets of a set of copy sheets; and
means for correcting a previously printed character by erasing the previously printed character when said device is in the normal mode and by overstriking the previously printed character when said device is in the copy mode.

20. The device recited in claim 19, wherein said switching means comprises a keyboard comprising a code key and a z key, and a microprocessor, for switching said device between the two modes in response to the simultaneous pressing of said code key and said z key.

21. The device recited in claim 19, further comprising a memory, wherein said microprocessor sets a flag in said memory when said device operates in the copy mode.

22. The device recited in claim 21, wherein said correcting means overstrikes the previously printed character when the flag is set and erases the previously printed character when the flag is not set.

23. A printing device comprising:
a keyboard comprising a plurality of keys including a correction key and a plurality of character keys;
means for correcting a previously printed character by overstriking the previously printed character in response to a manual operation of said correction key;
means for switching said device into and out of a character overstrike selecting mode for selecting a character to overstrike the previously printed character; and
a memory for storing the character selected in the character overstrike selecting mode,
wherein in the character overstrike selection mode when one of said character keys is depressed, the corresponding character is stored in said memory, and
wherein, in response to the manual operation of said correction key, the character stored in said memory overstrikes the previously printed character.

24. The device recited in claim 23, wherein said keyboard further comprises a code key and an X key, wherein said switching means comprises a microprocessor connected to said keyboard, said code key, and said X key, wherein said microprocessor switches said device into or out of the character overstrike selection mode in response to simultaneous pressing of said code key and said X key.

25. The device recited in claim 23, wherein said keyboard further comprises a non-character key representing a non-printable character, and wherein said non-printable character is not set in said memory when, in the character overstrike selection mode, the corresponding non-character key is depressed.

26. The device recited in claim 23, further comprising a hammer, a ribbon, and a letter plate adapted to be positioned between said hammer and said ribbon, said hammer being displaceable to strike said letter plate, said letter plate being displaceable to press said ribbon against a recording medium in response to being struck by said hammer,
wherein said memory comprises a random access memory, and
wherein said correcting means comprises said hammer, said ribbon, said letter plate, a hammer control unit connected to said hammer, a motor driver, a motor connected to said motor driver and said letter plate, and a microprocessor unit connected to said hammer control circuit and said motor driver.

27. An impact-type printing device for printing in normal and copy modes of operation, comprising;
a printer adapted to print a character with a plurality of impression pressures including a high impression pressure sufficient for printing on all of the sheets of a set of copy sheets;
selecting means for manually selecting one of a plurality of impression pressures when said device operates in the normal mode; and
a manually operable switch adapted to manually switch the device between the normal operation mode and the copy operation mode, wherein said manually operable switch comprises a separate component or components from said selecting means.

* * * * *

UNITED STATES PATENT AND TRADEMARK OFFICE
CERTIFICATE OF CORRECTION

PATENT NO. : 5,201,591

DATED : April 13, 1993

INVENTOR(S) : HIROYUKI UEDA, ET AL.

It is certified that error appears in the above-identified patent and that said Letters Patent is hereby corrected as shown below:

On the Title page,

[75] INVENTORS
"naoki Shimada" should read --Naoki Shimada--.

On the Title page,

[57] ABSTRACT
Line 5, "include" should read --includes--.

COLUMN 3
Line 31, "of the depression" should be deleted.

COLUMN 5
Line 17, "selection" should read --selecting--.
Line 51, "detail" should read --detailed--.

COLUMN 8
Line 65, "on" should be deleted.

COLUMN 9
Line 19, "#SN54LS373" should read --#SN54LS373 ▲--.

UNITED STATES PATENT AND TRADEMARK OFFICE
CERTIFICATE OF CORRECTION

PATENT NO. : 5,201,591
DATED : April 13, 1993
INVENTOR(S) : HIROYUKI UEDA, ET AL.

It is certified that error appears in the above-indentified patent and that said Letters Patent is hereby corrected as shown below:

COLUMN 12
Line 44, "corresponds" should read --correspond--.
Line 50, "code" should read --codes--.

COLUMN 13
Line 32, "a" should read --an--.

COLUMN 14
Line 17, "nay" should read --any--.

COLUMN 16
Line 59, "of" should be deleted and "claim 14" should read --claim 14,--.

COLUMN 18
Line 38, "comprising;" should read --comprising:--.

Signed and Sealed this

Nineteenth Day of October, 1993

BRUCE LEHMAN

Attest:

Attesting Officer

Commissioner of Patents and Trademarks